US 6,659,899 B2

(12) United States Patent
Naunheimer

(10) Patent No.: US 6,659,899 B2
(45) Date of Patent: Dec. 9, 2003

(54) ELECTROHYDRAULIC CONTROL SYSTEM FOR CONTROLLING GEARSPEED CHANGES IN PARTIALLY OR FULLY AUTOMATIC TRANSMISSIONS OF VEHICLES

(75) Inventor: Harald Naunheimer, Augsburg (DE)

(73) Assignee: RENK Aktiengesellschaft, Augsburg (DE)

( * ) Notice: Subject to any disclaimer, the term of this patent is extended or adjusted under 35 U.S.C. 154(b) by 0 days.

(21) Appl. No.: 10/170,084

(22) Filed: Jun. 11, 2002

(65) Prior Publication Data

US 2002/0193198 A1 Dec. 19, 2002

(30) Foreign Application Priority Data

Jun. 18, 2001 (DE) .......................................... 101 28 805

(51) Int. Cl.$^7$ ............................................... F16H 31/00
(52) U.S. Cl. ....................................... 475/119; 477/906
(58) Field of Search ......................... 477/906; 475/119, 475/133

(56) References Cited

U.S. PATENT DOCUMENTS

| | | | | | |
|---|---|---|---|---|---|
| 4,827,806 | A | * | 5/1989 | Long et al. | 477/906 |
| 4,981,052 | A | * | 1/1991 | Gierer | 477/906 |
| 5,682,792 | A | * | 11/1997 | Liesener et al. | 477/906 |
| 6,077,182 | A | * | 6/2000 | Long et al. | 477/906 |
| 6,520,881 | B1 | * | 2/2003 | Long et al. | 475/119 |
| 6,585,617 | B1 | * | 7/2003 | Moorman et al. | 475/119 |

OTHER PUBLICATIONS

Patent Abstracts of Japan 63243553, Oct. 11, 1988.

* cited by examiner

*Primary Examiner*—Dirk Wright
(74) *Attorney, Agent, or Firm*—Cohen, Pontani, Lieberman & Pavane

(57) ABSTRACT

A control unit has a signal input from at least one sensor and a signal output for electrically actuating at least one valve in order to hydraulically activate a gear-changing element. An emergency gear change slide can switch off the electrical actuation of the valves so that hydraulic modulation can be carried out.

11 Claims, 2 Drawing Sheets

ELECTROHYDRAULIC CONTROL SYSTEM FOR CONTROLLING GEARSPEED CHANGES IN PARTIALLY OR FULLY AUTOMATIC TRANSMISSIONS OF VEHICLES

BACKGROUND OF THE INVENTION

1. Field of the Invention

The invention relates to an electrohydraulic control system for controlling gearspeed changes in partially or fully automatic transmissions having at least one gear changing element that can be activated hydraulically, a control unit with a signal input from at least one sensor, and a signal output for electrically actuating at least one value in order to activate a gear changing element.

2. Description of the Related Art

It is generally known to control partially or fully automatic transmissions electrohydraulically. In electrohydraulic transmission controllers it is possible to distinguish between systems which have a separate pressure modulation level— i.e. the working pressure for the gear-changing elements is generated in an oil circuit and the control slide which conducts this working pressure to the gear-changing element is shifted by means of a further control level generally with a lower oil pressure level via a solenoid valve—and systems which have direct hydraulic actuation of the gear-changing elements.

The uncertain variable in an automatic gear-changing operation is the dead time between a gear-changing command and the effect on the gear-changing element, which effect is dependent on the air play, i.e. on the distance between the force-transmitting elements when they are in the opened state—the wear state, the installation tolerances etc. This uncertainty can be significantly reduced by precharging the clutch and measuring the working pressure, thus improving the response behaviour of the clutch. As a result of direct electrohydraulic actuation of each gear-changing element, the gear-changing behaviour can be influenced most effectively and most flexibly, but when an electrical unit fails, all the gear-changing elements must be deactivated in order to protect the occupants of the vehicle and the transmission or the gear-changing elements of a certain gearspeed must be activated so that a gearspeed change is no longer possible.

SUMMARY OF THE INVENTION

Taking this as a starting point, the object of the invention is to provide an electrohydraulic control system for fully or partially automated transmissions, which permits gear-changing operations in an emergency mode when an electrical or electronic element fails.

This object is achieved according to the invention by means of an emergency gear change slide which can switch off the electrical actuation of the valves so that the valves can be controlled hydraulically.

In one control system according to the invention, all the regulating magnets are switched off when there is a power failure or when there are other errors in the electronics. The regulating valve slide can then advantageously be hydraulically modulated with an emergency gear change device. This is then a case of passive redundancy with an electrical "shift-by-wire" main path—i.e. in the normal mode gearspeed changes are controlled by means of electrical signals—and a mechanical/hydraulic secondary path which is activated only when the first fails. The selected approach can be used to implement operations ranging from the maintenance of the gear last engaged when there are electrical errors, to hydraulic locking operations such as correspond to the prior art in military caterpillar vehicles.

The emergency gear-changing operation makes it possible in a particularly advantageous way to change the gear of the transmission temporarily when there is a failure of the supply voltage, a defect in the electronic controller or some other electrical fault.

The control system according to the invention is particularly flexible and can easily be adapted to different types of transmission.

Further features and advantages emerge from the subclaims in conjunction with the description.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
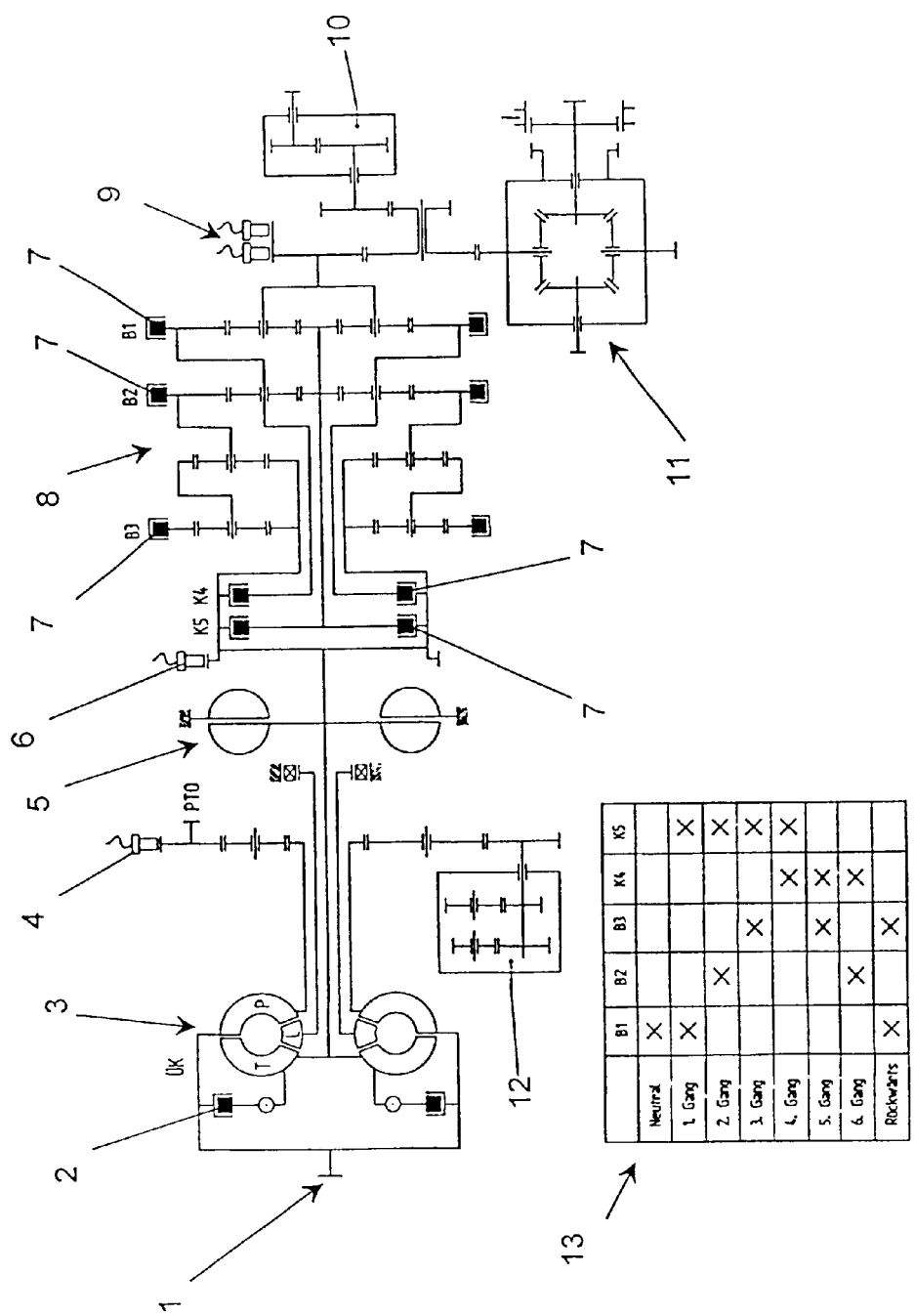
FIG. 1 shows an exemplary transmission configuration of a six-gearspeed transmission.

FIG. 1 represents an exemplary transmission configuration of a six-gearspeed transmission in which an embodiment of the control system according to the invention is applied. In addition to the use on transmissions of a planetary construction, a control system according to the invention can also be provided for other designs of partially or fully automatic transmissions.

The power which is output by the drive engine is output to a conventional torque converter 3 via the transmission input 1. The torque converter is preferably equipped with a converter lockup clutch 2. The impeller wheel of the torque converter 3 can drive a secondary output transmission via a gear train. On one of these wheels, a rotational speed sensor 4 is arranged which picks up the rotational speed of the drive motor. By means of a further gear train, the impeller wheel drives a hydraulic pump 12 which feeds the oil flow to control and actuate the gearspeed clutches.

A retarder 5 which permits wear-free braking of the vehicle is preferably arranged on the turbine wheel shaft of the torque converter 3. Furthermore, a further rotational speed sensor 6, which picks up the input rotational speed into the transmission, is arranged on the turbine wheel shaft. By appropriately activating the gear-changing elements 7, it is possible to define the force flux through the planetary gearwheel sets 8. The gear-changing configuration 13 indicates which gear-changing elements 7 are to be shifted for which gearspeed. Lamella clutches, which are shifted by means of hydraulically actuated pistons, are inserted at the input of the planetary gearwheel sets 8 as gear-changing elements. The rotatably mounted crown gears of the planetary sets 8 can be housing-fixed to further gear-changing elements 7—which are embodied as brakes which can be actuated hydraulically.

The planetary gearwheel carrier of the last planetary gearwheel set drives, for example, a differential transmission by means of spur pinions into a transmission output drive 11. A further rotational speed sensor 9, which also picks up the direction of rotation and thus detects forward or backward travel, is arranged on one of these spur pinions. A further pump 10 is driven at the transmission output via spur pinions, which pump 10 ensures that there is the necessary working and control pressure in the hydraulic system and the necessary lubrication oil pressure when the vehicle is being towed when the engine is stationary.

Figure 2:
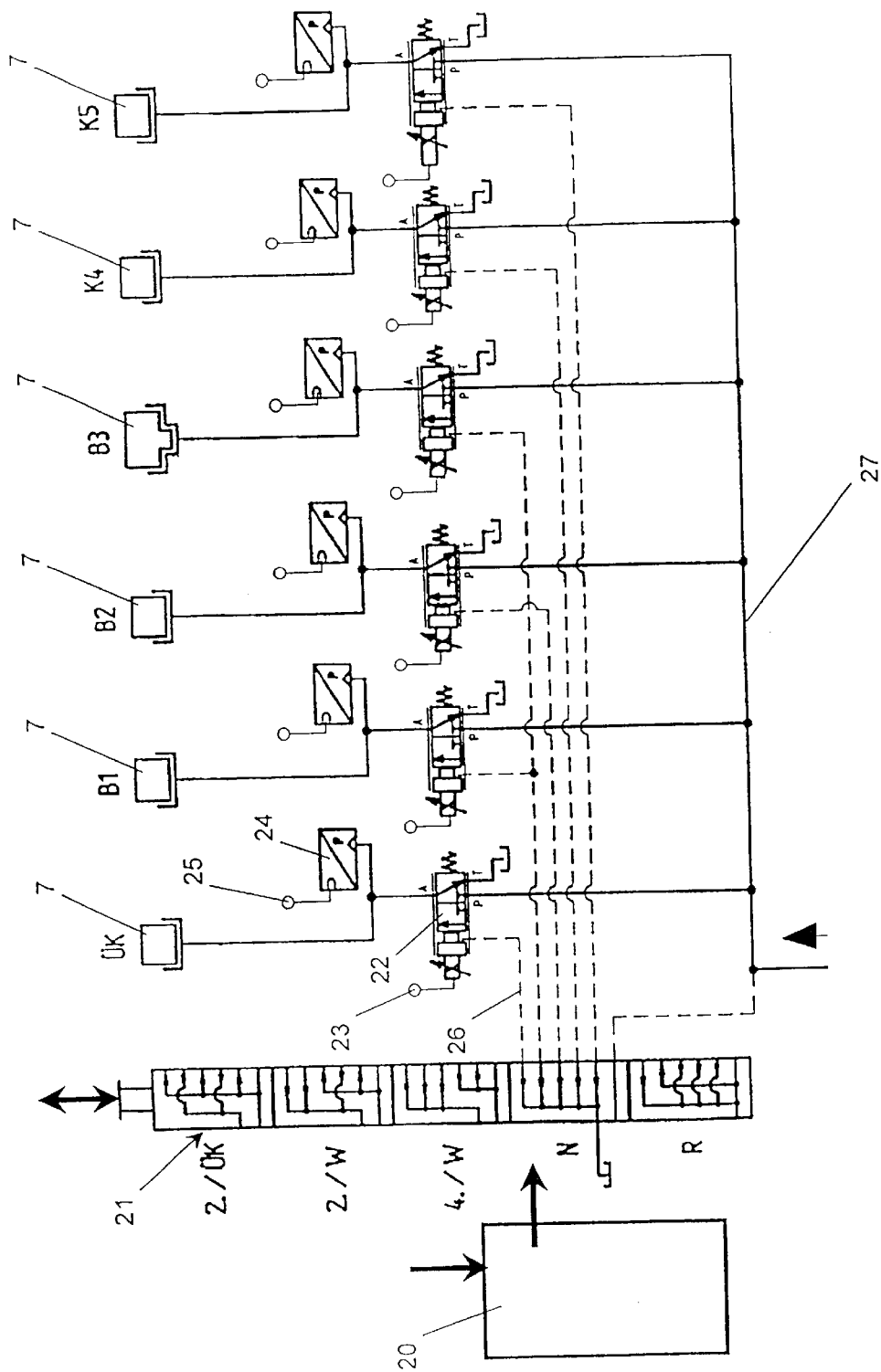
FIG. 2 shows an electrohydraulic control system which is embodied according to the invention, for this transmission.

FIG. 2 shows the elements of an electrohydraulic control system according to the invention such as is provided in the exemplary transmission according to FIG. 1. Each gear-changing element 7 is assigned a valve 22 at which the oil pressure of the hydraulic system 27 is present. The oil pressure of the hydraulic system 27 can be generated by one of the pumps 10 or 12 shown in FIG. 1.

The valves 22 are preferably 3/2-way proportional valves which can be activated electromagnetically and which are electrically controlled and regulated by a control unit 20 in normal operating mode. The control unit 20 can implement load shifts, i.e. control gearspeed changes in which the power flux in the transmission is not interrupted. For this purpose, the control unit 20 determines the time when the gear-changing element 7 to be shifted is charged with oil and reduces the torque transmission via the instantaneous gearspeed in the region of synchronization, while the ability to be able to transmit torque by the next gearspeed is increased. For such overlapping gear-changing operations the oil pressure in the two gear-changing elements 7 involved must be controlled and regulated in such a way that, on the one hand, there is no interruption in the tensile force and, on the other hand, no overloading or destruction of the transmission parts occurs. The overloading or destruction can be caused by oil pressures which are excessively high during the chronological sequence at the gear-changing elements 7 involved.

The 3/2-way proportional valves which are preferably used have 3 oil ports and can be regulated by means of an electromagnet which can be actuated. The oil flow rate behaves proportionally to the electrical current at the electromagnet. The electromagnet of the valve 22 is actuated by the control unit 20 by means of an electrical control terminal 23 in such a way that it sets the oil pressure at the gear-changing element 7 in accordance with the control pulses by means of the feed flow rate of the hydraulic system pressure 27. It is preferably possible to provide a pressure sensor 24 in the working line near to the cylinder of the gear-changing element 7, which pressure sensor 24 is connected to the control unit 20 via an electrical signal terminal 25.

The signals of the rotational speed sensors 4, 6, 9 which are shown in FIG. 1 are also processed in the control unit 20 and can be used for a combined pressure/rotational speed regulation.

In the de-energized state, the valves 22 are moved into an off position by a spring. In this position, the working line, connected to the gear-change element 7, is connected to the return flow line to the reservoir vessel and the present oil pressure of the hydraulic system 27 is shut off.

The invention makes it possible to use the advantages of the electrohydraulic direct actuation of each individual gear-changing element, for example the gear-changing comfort, and continue to shift various gearspeeds by means of a mechanical/hydraulic emergency switch if an electronic/electrical component fails. For this purpose, the electromagnetic actuation of each valve 22 can also be modulated hydraulically. In the valves 22 which are preferably used, the electromagnet which is connected to the control slide for changing gears or regulating, the pressure space for the working oil and a pressure space for hydraulic modulation are integrated in one physical unit, the slide disconnecting the various pressure spaces from one another and opening or shutting the corresponding paths in accordance with the position of its control edges. The pressure space for hydraulic modulation is connected to a hydraulic control line 26 which switches on the valve 22 when pressure is applied, i.e. applies the working pressure of the hydraulic system 27 to the gear-changing element 7.

A corresponding shift setting is to be provided on an emergency gear change slide 21 for each gearspeed which can be shifted during the emergency operating mode and for the neutral setting of the transmission, and a pressure port is to be provided for each valve 22—which is assigned to a gear-changing element 7. In the respective shift setting of the emergency gear change slide 21, the pressure of the hydraulic system 27 is conducted via appropriately provided ducts to the valves 22 which are to be switched on, and the oil is conducted from the valves 22 to be switched off into the reservoir vessel via other corresponding ducts. FIG. 2 shows only one exemplary embodiment of the emergency gear change slide 21 according to the invention. The first setting shifts the 2nd gearspeed when the converter lockup clutch of the torque converter 3 is closed, in order to be able to tow the vehicle. In other settings, the 2nd and 4th gearspeeds or the reverse gear can be respectively operated by means of the torque converter 3. A fifth setting places the transmission in the neutral position.

The emergency gear change slide 21 is preferably integrated into a hydraulic control block on the transmission and can be mechanically shifted into the various shift settings in a manual fashion. Mechanical transmission elements can be provided by means of which the emergency gear change slide 21 can be shifted from the driver's cab.

The control unit 20 can be supplied via further sensors with information relating to the electrical devices, environmental influences or with other signals and can distinguish, for example, when pressure deviations occur, between acceptable fault signals which occur only briefly and, for example, are generated electromagnetically or caused by vibrations, and actual incorrect pressures which could destroy the transmission. When actual faults, for example short circuits, or the operation of the emergency gear change slide 21 despite the electrohydraulic controller being active, are detected, the electrical devices are de-energized and the valves 22 drop into the opened state. This ensures that the emergency gear change slide 21, which is intended to carry out the hydraulic modulation of the valves 22 only in the de-energized state, is protected against misuse.

In addition to the detection of operation or incorrect operation of the emergency gear change slide 21 by means of the incorrect pressures described above, further sensors, for example microswitches, can also be arranged directly on the emergency gear change slide 21 and/or an associated actuation device, for example in the driver's cab. The latter pass on corresponding signals to the control unit 20 which can subsequently initiate the respective measures.

In the 3/2-way valves which are preferably used, it is advantageously possible to set the current for the zero crossover. This means that the electrical current which is to be applied in order to shut off the valve can be adjusted at the valve.

As an alternative to the described directional control valves, other valves which function according to the same principle of action may also be provided.

The electrohydraulic control system according to the invention provides a flexible modular unit which ensures a high degree of functional reliability—irrespective of changes in external parameters (for example temperature etc.) and irrespective of changes in internal parameters (for example wear, coefficient of friction changes etc.)—with increased gear-changing comfort, and can be used to control various types of transmission while eliminating the influences of component tolerances, and also makes possible gear-changing operations in an emergency mode when an electronic or electrical component fails.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. An electrohydraulic control system for controlling gear speed changes in partially or fully automatic transmissions of vehicles having at least one gear changing element, said system comprising at least one hydraulic valve for actuating said at least one gear changing element, at least one sensor providing a signal input, a control unit which receives said signal input and provides a signal output for electrical actuation of said at least one hydraulic valve, and an emergency gear change slide which can switch off the electrical actuation of the at least one hydraulic valve so that the at least one valve can be controlled hydraulically.

2. An electrohydraulic control system as in claim 1 wherein said at least one gear changing element is a friction clutch which can be actuated by one of a hydraulic piston and a brake, and which transmits a torque which can be adjusted by oil pressure.

3. An electrohydraulic control system as in claim 1 comprising a plurality of said valves for actuating a plurality of said gear changing elements, said valves being electrically actuable on an individual basis, each said valve comprising a housing, an electromagnetic shifting/regulating unit, a pressure space for hydraulic modulation, and pressure spaces for working oil pressure integrated into said housing.

4. An electrohydraulic control system as in claim 1 wherein said control unit provides a signal output having a variable electrical current, said hydraulic valve having a flow which is proportional to said electrical current and a shut-off position, the electrical current for said shut-off position being adjustable.

5. An electrohydraulic control system as in claim 1 wherein said at least one sensor comprises a pressure sensor on each said gear changing element, and a rotational sensor on the transmission, said sensors providing signals which are evaluated in said control unit.

6. An electrohydraulic control system as in claim 5 wherein said control unit initiates gear speed changes by transmitting output signals which control the pressure and rotational speed.

7. An electrohydraulic control system as in claim 1 further comprising means for mechanically activating said emergency gear change slide.

8. An electrohydraulic actuator as in claim 7 wherein said means for mechanically activating said emergency gear change slide comprises transmission elements in a driver's cab for shifting said slide.

9. An electrohydraulic control system as in claim 1 further comprising means for de-energizing all electrical control devices for the transmission when said emergency gear change slide is activated for hydraulic control of said at least one valve.

10. An electrohydraulic control system as in claim 1 comprising a sensor which detects activation of the emergency gear change slide and passes a corresponding signal to the control device.

11. An electrohydraulic control system as in claim 1 wherein said valve can be actuated electrically or hydraulically.

* * * * *